United States Patent [19]

Matrick et al.

[11] Patent Number: 5,173,112
[45] Date of Patent: Dec. 22, 1992

[54] NITROGEN-CONTAINING ORGANIC COSOLVENTS FOR AQUEOUS INK JET INKS

[75] Inventors: Howard Matrick, Highlands, N.J.; Dominic M. Chan, Wilmington, Del.; Glenn M. Russo, Mullica Hill, N.J.

[73] Assignee: E. I. du Pont de Nemours and Company, Wilmington, Del.

[21] Appl. No.: 863,011

[22] Filed: Apr. 3, 1992

[51] Int. Cl.$^5$ .............................................. C09D 11/02
[52] U.S. Cl. .................................... 106/20; 106/22 H
[58] Field of Search .................................... 106/20, 22

[56] References Cited

U.S. PATENT DOCUMENTS

| 4,308,061 | 12/1981 | Iwahashi et al. | 106/20 |
| 5,000,786 | 3/1991 | Matsuzaki . | |
| 5,006,170 | 4/1991 | Schwarz et al. . | |
| 5,017,224 | 5/1991 | Tomita et al. | 106/20 |
| 5,085,698 | 2/1992 | Ma et al. | 106/20 |
| 5,102,460 | 4/1992 | You et al. | 106/27 |
| 5,118,347 | 6/1992 | You et al. | 106/20 |
| 5,122,187 | 6/1992 | Schwarz et al. | 106/20 |

FOREIGN PATENT DOCUMENTS

| 0486028 | 1/1992 | European Pat. Off. . |
| 57-36171 | 2/1982 | Japan . |
| 61-42753 | 9/1986 | Japan . |
| 103274 | 4/1990 | Japan . |

Primary Examiner—Shrive Beck
Assistant Examiner—Helene Klemanski

[57] ABSTRACT

Aqueous ink jet ink compositions comprising an aqueous carrier medium, a colorant, such as a pigment dispersion or dye, and a nitrogen-containing organic cosolvent having a solubility in water of at least 4.5 % at 25° C., exhibit freedom from plug formation and excellent storage stability.

23 Claims, No Drawings

NITROGEN-CONTAINING ORGANIC COSOLVENTS FOR AQUEOUS INK JET INKS

FIELD OF THE INVENTION

This invention relates to aqueous inks for ink jet printers. More particularly, this invention relates to aqueous ink jet inks comprising selected nitrogen-containing cosolvents that impart resistance to nozzle plug formation and improved ink stability.

BACKGROUND OF THE INVENTION

Ink jet printing is a non-impact method that produces droplets of ink that are deposited on a substrate such as paper or transparent film in response to an electronic digital signal. Thermal or bubble jet drop-on-demand ink jet printers have found broad application as output devices for personal computers in the office and the home.

Thermal ink jet printers use a plurality of nozzles each containing a resistor element to fire ink droplets toward the print substrate. Nozzle openings are typically about 25–50 micrometers in diameter. These small openings are easily plugged by precipitating, crystallizing or flocculating materials or by particulate foreign matter. The nozzle openings are exposed to the atmosphere, thereby rendering the ink subject to evaporation or reaction with oxygen or carbon dioxide with the potential to produce particulate, non-dispersed material causing formation of a plug in the nozzle openings. In dye-based inks, evaporation can cause crystallization or precipitation of the dye or solid additives, commonly referred to as "crusting." In pigment-based inks this evaporation can cause precipitation of the dispersant, flocculation of the pigment dispersion, and precipitation of solid additives.

Accordingly, a critical requirement for an ink jet ink is the ability to remain fluid upon exposure to air, so called "decap" conditions. This allows a pen to function after a period of non-use ("long-term decap") or during operation of infrequently utilized nozzles ("short-term decap"). A major concern with all ink jet printers is pluggage of nozzles during operation and between operations. Decap time is a measure of the interval of time that a nozzle can remain exposed to air and continue to print.

Initial evaporation generally causes an increase in viscosity which affects the ability of the nozzle to fire a drop of ink since ink jet pens are designed to operate within specific viscosity ranges. The inception of pluggage may cause distortion of the image, which may appear as a drop of ink which is displaced from its intended position or a splitting of the drop into two or more droplets displaced from the intended target position. In addition, "streamers" or "banners" may appear as artifacts attached to the right side of the alphanumeric characters. On some occasions the drop may reach its intended position but at a lower drop volume producing a lower optical density image. Ultimately the plugged nozzle will fail to fire and no image will be generated.

In a decap test, a series of successive drops are fired at predetermined and increasing time intervals. For example, if the time interval between firings is set at five minutes, then the printings will take place after intervals of 5 minutes, then 10 minutes, then 15 minutes, etc. The interval of time needed to cause failure of the first, fifth and thirty-second consecutively printed drops are recorded. The first drop failure interval is important because it is the critical measure of the reliability of the system without the need for engineering or software cures for printing failure. In addition, it affects the productivity or printing rate because programmed routines must be used to clear the pluggage, so-called "spitting" and these routines interrupt the actual printing chore. The thirty-second drop decap time determines the period of time that a nozzle can remain uncapped and recover after 32 non-printing firings.

Several methods of addressing the crusting problems are known in the art. For example, most ink jet printers are designed to prevent excessive evaporation of solvent from pen nozzles by seating the pen cartridge in an air tight chamber when not in use. These devices become ineffective with continued printer use because dried ink deposits at the rubber seals and the system loses its air-tight condition. Also, it is possible to shut down a printer inadvertently and prematurely, thereby not allowing the printer routine to place the pen nozzles in the air-tight capping chamber.

Another device to combat pluggage is a elastomeric wiper that removes solid formed at the surface of the nozzle. This device is often ineffective because the depth or hardness of the plug resists mechanical removal.

Another pluggage fix is the use of forced air or vacuum suction to clear the nozzle. These devices are often ineffective and add considerable expense to the cost of the printer.

A second critical requirement for inks where the colorant is a pigment is for the pigment dispersion to remain stable throughout the life of the ink jet cartridge. Many cosolvents that impart long decap or rapid penetration are incompatible with the pigment dispersion and therefore cannot be used.

Therefore a need exists for aqueous ink jet inks with good dispersion stability and high resistance to plug formation.

SUMMARY OF THE INVENTION

In accordance with this invention, there is provided an aqueous ink jet ink composition consisting essentially of:

(a) an aqueous carrier medium;

(b) a colorant selected from the group consisting of a pigment dispersion and a dye; and (c) an organic cosolvent having a solubility in water of at least 4.5% a 25° C., and which is selected from the group consisting of:

1) alkyl amides having the general structure:

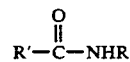

wherein
R=—H or —CH$_3$,
R'=—C$_3$H$_8$ or —C(CH$_3$)$_2$, when R=—H, and
R'=—C$_2$H$_5$, when R=—CH$_3$;

2) cyclic amides having the general structure:

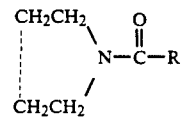

wherein R=—H or —CH$_3$;

3) cyclic diamides having the general structure:

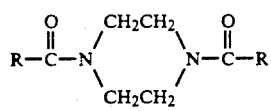

wherein R=—H or —CH$_3$;

4) alkyl diamides having the general structure:

wherein R=—H or —CH$_3$;

5) alkyl diol diamides having the general structure:

wherein R=—H, —CH$_3$ or —C$_2$H$_5$;

6) hydroxyamides having the general structure:

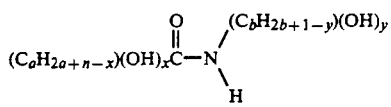

wherein
a=1-6,
b=2-4,
x=0-3,
y=0-3,
x+y=1-6,
n=+1 or −1,
a≧x,
b≧y;

7) hydroxyalkyl ureas having the general structure:

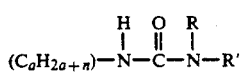

wherein
a=1-7,
n=+1 or −1,
R is selected from the group consisting of —CH$_2$CHOHCH$_2$OH and —CH$_2$CH$_2$OH, and
R' is selected from the group consisting of —CH$_2$CH$_2$OH and —H; and 8) mixtures thereof.

DETAILED DESCRIPTION OF THE INVENTION

The ink jet ink compositions of this invention are particularly suited for use in ink jet printers in general, and thermal ink jet printers in particular. The ink jet ink compositions encompasses both pigment and dye colorant inks. The inks may be adapted to the requirements of a particular ink jet printer to provide a balance of light stability, smear resistance, viscosity, surface tension, optical density, low toxicity, high material compatibility and drying rate. The organic cosolvents of this invention are stable to oxygen and are especially resistant to hydrolysis in aqueous inks when formulated near a neutral pH.

AQUEOUS CARRIER MEDIUM

The aqueous carrier medium comprises water (preferably deionized water) or a mixture of water and at least one water soluble organic solvent other than the selected nitrogen-containing solvent. Representative examples of water-soluble organic solvents are disclosed in U.S. Pat. No. 5,085,698, the disclosure of which is incorporated herein by reference. Selection of a suitable mixture of water and water soluble organic solvent depends upon the requirements of the specific application, such as desired surface tension and viscosity, the selected colorant, drying time of the ink, and the type of substrate onto which the ink will be printed.

A mixture of a water soluble organic solvent having at least 1 hydroxyl group (diethylene glycol, triethylene glycol, butyl carbitol, etc.) and deionized water is preferred as the aqueous carrier medium. The aqueous carrier medium usually contains from about 5% to about 95% water, with the remainder (i.e., 95% to about 5%) being the water soluble organic solvent. The preferred ratios are approximately 60% to about 95% water, based on the total weight of the aqueous carrier medium. Most preferably, the aqueous vehicle comprises about 90% water and the balance a glycol ether such as butyl carbitol. Higher concentrations of glycols may result in poor print quality. Lower concentrations will lead to drying out of the printhead or "crusting" of the ink. The aqueous carrier medium is present in the range of approximately 65 to 99.8%, preferably approximately 85 to 98.5%, based on the total weight of the ink.

When a mixture of water and organic solvent is used, the aqueous carrier medium usually contains between 30% and 95%, preferably 60% to 95%, water based on the total weight of the aqueous carrier medium plus organic cosolvent. The amount of aqueous carrier medium plus organic cosolvent is in the range of approximately 70 to 99.8%, preferably approximately 94 to 99.8%, based on the total weight of the ink when an organic pigment is selected; approximately 25 to 99.8%, preferably approximately 70 to 99.8% when an inorganic pigment is selected; and 80 to 99.8% when a dye is selected.

COLORANTS

The colorants useful in the present invention may be a pigment dispersion or a dye. The term pigment dispersion, as is known in the art and as used herein, refers to a mixture of a pigment and a dispersing agent. Preferably, the dispersing agent is a polymeric dispersant compound.

Dyes which are commonly used in aqueous ink jet inks, such as for example Acid, Direct, Food and Reactive dyes, are suitable colorants for the ink compositions of the present invention.

In the preferred embodiment of the present invention, the colorant is a pigment dispersion. In addition to, or in place of the preferred polymeric dispersant compounds, surfactant compounds may be used as dispersants. These may be anionic, cationic, nonionic, or amphoteric surfactants. A detailed list of non-polymeric as well as some polymeric dispersants are listed in the section on dispersants, pages 110-129, 1990 McCutcheon's Functional Materials, North American Edition, Manufacturing Confection Publishing Co., Glen Rock, N.J., 07452, the disclosure of which is incorporated herein by reference.

Polymeric dispersants suitable for practicing the invention include AB, BAB or ABC block copolymers. In the AB or BAB block copolymers, the A segment is a hydrophobic (i.e., water insoluble) homopolymer or copolymer which serves to link with the pigment and the B block is a hydrophilic (i.e., water soluble) homopolymer or copolymer, or salts thereof, and serves to disperse the pigment in the aqueous medium. Such polymeric dispersants and the synthesis thereof are disclosed in the aforementioned U.S. Pat. No. 5,085,698.

Preferred AB block polymers are: methyl methacrylate//methyl methacrylate/methacrylic acid(10//5/7.5), 2-ethylhexyl methacrylate//2-ethylhexyl methacrylate/methacrylic acid(5//5/10), n-butyl methacrylate//n-butyl methacrylate/methacrylic acid (10//5/10), n-butyl methacrylate//methacrylic acid(10//10), ethylhexyl methacrylate//methyl methacrylate/methacrylic acid (5//10/10), n-butyl methacrylate//2-hydroxyethyl methacrylate/methacrylic acid(5//10/10), n-butyl methacrylate//2-hydroxyethyl methacrylate/methacrylic acid (15//7.5/3), methyl methacrylate//ethylhexyl methacrylate/methacrylic acid (5//5/10), and butyl methacrylate//butyl methacrylate/dimethylaminoethyl methacrylate(5//5/10).

Preferred BAB block polymers are: n-butyl methacrylate/methacrylic acid//n-butyl methacrylate//n-butyl methacrylate/methacrylic acid (5/10//5/10), methyl methacrylate/methacrylic acid//methyl methacrylate//methyl methacrylate/methacrylic acid (5/7.5//10//5/7.5). The double slash indicates a separation between blocks and a single slash indicates a random copolymer. The values in parenthesis represent the degree of polymerization of each monomer.

ABC triblock copolymers that can be used to advantage in the present invention comprise a hydrophilic A block, a B block which is capable of binding to the pigment, and a hydrophilic or hydrophobic C block. Suitable ABC block copolymers and their method of synthesis are disclosed in Assignee's copending U.S. application Ser. Nos. 07/838,181, filed Feb. 20, 1992 and 07/838,165, filed Feb. 20, 1992, the disclosures of which are incorporated herein by reference. Preferred ABC triblock polymers include poly(methacrylic acid//2-phenethyl methacrylate//ethoxytriethylene glycol methacrylate) (13//10//4); poly(methacrylic acid//2-phenethyl methacrylate/dimethylaminoethyl methacrylate ethoxytriethylene glycol methacrylate) (13//8/2//4); poly(methacrylic acid//benzyl methacrylate//ethoxytriethylene glycol methacrylate) (13//10//4); poly (methacrylic acid//2-phenethyl methacrylate//methoxypolyethylene glycol 400 methacrylate) (13//10//4); poly(dimethylaminoethyl methacrylate/methyl methacrylate//2-phenethyl methacrylate//ethoxytriethylene glycol methacrylate) (7.5/5//10//4).

To solubilize the polymers into the aqueous medium, it may be necessary to neutralize the acid or amino groups contained in the polymer. Neutralizing agents for the acid groups include organic bases; alcohol amines; pyridine; ammonium hydroxide; tetraalkylammonium salts; alkali metals such as lithium, sodium and potassium, and the like. Neutralizing agents for the amino groups include organic acids such as acetic, formic and oxalyic; halogens such as chloride, fluoride and bromide; inorganic acids such as sulfuric and nitric; and the like..

Although random copolymers can be used as dispersing agents, they are not as effective in stabilizing pigment dispersions as the block polymers, and therefore are not preferred.

The acrylic block polymer is present in the range of approximately 0.1 to 30% by weight of the total ink composition, preferably in the range of approximately 0.1% to 8% by weight of the total ink composition. If the amount of polymer becomes too high, the ink color density will be unacceptable and it will become difficult to maintain desired ink viscosity. Dispersion stability of the pigment particles is adversely affected if insufficient acrylic block copolymer is present.

Useful pigments for the dispersion comprise a wide variety of organic and inorganic pigments, alone or in combination. The term "pigment" as used herein means an insoluble colorant. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 micron. Preferably, the pigment particle size should range from 0.005 to 5 micron and most preferably, from 0.01 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in the aforementioned U.S. Pat. No. 5,085,698.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments.

Up to 20% of dye may be present, based on the total weight of the ink.

COSOLVENTS

The organic cosolvents of the present invention have a solubility in water of at least 4.5% (4.5 parts cosolvent in 100 parts of water) at 25° C. and are selected from the group consisting of:

1) alkyl amides having the general structure:

$$R'-\overset{O}{\underset{\|}{C}}-NHR$$

wherein
R=—H or —CH$_3$,
R'=—C$_3$H$_8$ or —C(CH$_3$)$_2$, when R=—H, and
R'=—C$_2$H$_5$, when R=—CH$_3$.

An example of amides fitting this formula include is isobutyramide.

2) cyclic amides having the general structure:

$$\begin{array}{c}CH_2CH_2\\ |\quad\quad\quad\searrow\\ \quad\quad\quad\quad N-\overset{O}{\underset{\|}{C}}-R\\ |\quad\quad\quad\nearrow\\ CH_2CH_2\end{array}$$

wherein R=—H or —CH$_3$.

Examples of amides fitting this formula include: 1-pyrrolidinecarboxaldehyde and N-acetylpyrrolidine.

3) cyclic diamides having the general structure:

$$R-\overset{O}{\underset{\|}{C}}-N\begin{array}{c}\diagup CH_2CH_2\diagdown\\ \diagdown CH_2CH_2\diagup\end{array}N-\overset{O}{\underset{\|}{C}}-R$$

wherein R=—H or —CH$_3$.

Examples of amides fitting this formula include: 1,4-piperazinedicarboxaldehyde and N,N'-diacetylpiperazine.

4) alkyl diamides having the general structure:

$$R-\overset{O}{\underset{\|}{C}}-NHCH_2CH_2NH-\overset{O}{\underset{\|}{C}}-R$$

wherein R=—H or —CH$_3$.

Examples of amides fitting this formula include: N,N'-ethylene bisformamide and N,N'-ethylene bisacetamide.

5) alkyl diol diamides having the general structure:

$$R_2N-\overset{O}{\underset{\|}{C}}-CH(OH)CH(OH)-\overset{O}{\underset{\|}{C}}-NR_2$$

wherein R=—H, —CH$_3$, or —C$_2$H$_5$.

Examples of amides fitting this formula include: tartaric acid diamide, N-methyltartaric acid diamide, N,N-dimethyltartaric acid diamide, N,N'-dimethyltartaric acid diamide, N,N,N',N'-tetramethyltartaric acid diamide, N,N,N',N'-tetraethyltartaric acid diamide and the like.

6) Hydroxyamides having the general structure:

$$(C_aH_{2a+n-x})(OH)_x\overset{O}{\underset{\|}{C}}-N\begin{array}{c}\diagup (C_bH_{2b+1-y})(OH)_y\\ \diagdown H\end{array}$$

wherein
a=1-6,
b=2-4,
x=0-3,
y=0-3,
x+y=1-6,
n=+1 or −1,
a≧x, and
b≧y.

When n=+1, the group is acyclic. When n=−1, the group is cyclic, e.g. cyclopentyl, cyclohexyl. The total number of hydroxyl groups is x+y. Preferably a=1-4, b=2-3 and y=1. Also preferred are compounds where x=2 and y=1-2.

Examples of hydroxyamides of this structure are N-(2-hydroxyethyl)acetamide, N-(2-hydroxyethyl)butanamide, N-(2-hydroxyethyl)methyl-propanamide, DL-Panthenol and various isomers of N-(2-hydroxyethyl)hexanamide and the like.

7) Hydroxyalkylureas having the general structure:

$$(C_aH_{2a+n})-\overset{H}{\underset{|}{N}}-\overset{O}{\underset{\|}{C}}-\overset{R}{\underset{|}{N}}-R'$$

wherein
a=1-7,
x=+1 or −1,
R is selected from the group consisting of: —CH$_2$CHOHCH$_2$OH and —CH$_2$CH$_2$OH, and
R' is selected from the group consisting of: —CH$_2$CH$_2$OH and —H.

Examples of hydroxyalkylureas of this structure are 3-N-(N'-methylureido)-1,2-propanediol, 3-N-(N'-ethylureido)-1,2-propanediol, 3-N-(N'-1'-propylureido)-1,2-propanediol, 3-N-(N'-2'-propylureido)-1,2-propanediol, 3-N-(N'-1'-n-butylureido)-1,2-propanediol, 3-N-(N'-2'-butylureido)-1,2-propanediol, 3-N-(N'-isobutylureido)-1,2-propanediol, 3-N-(N'-tertbutylureido)-1,2-propanediol, the various pentyl isomers of 3-N-(N'-pentylureido)-1,2-propanediol, the various hexyl isomers of 3-N-(N'-hexylureido)-1,2-propanediol, 3-N-(N'-cyclopentylureido)-1,2-propanediol, 3-N-(N'-cyclohexylureido)-1,2-propanediol, 3-N-(N'-cycloheptylureido)-1,2-propanediol, N-(N'-methylureido)-N,N-bis(ethanol-2), 3-N-(N'-ethylureido)-N,N-bis(ethanol-2), 3-N-(N'-1'-propylureido)-N,N-bis(ethanol-3-N-(N'-2'-propylureido)-N,N-bis(ethanol-2), 3-N-(N'-1'-n-butylureido)-N,N-bis(ethanol-2), 3-N-(N'-2'-butylureido)-N,N-bis(ethanol-2), 3-N-(N'-isobutylureido)-N,N-bis(ethanol-2), 3-N-(N'-tertbutylureido)-N,N-bis(ethanol-2), the various pentyl isomers of 3-N-(N'-pentylureido)-N,N-bis(ethanol-2), the various hexyl isomers of 3-N-(N'-hexylureido)-N,N-bis(ethanol-2), 3-N-(N'-cyclopentylureido-N,N-bis(ethanol-2), 3-N-(N'-cyclohexylureido)-N,N-bis(ethanol-2), 3-N-(N'-cycloheptylureido)-N,N-bis(ethanol-2), N-(N'-methylureido)-N-ethanol-2, 3-N-(N'-ethylureido)-N-ethanol-2, 3-N-(N'-1'-propylureido)-N-ethanol-2, 3-N-(N'-2'-propylureido)-N-ethanol-2, 3-N-(N'-1'-n-butylureido)-N-ethanol-2, 3-N-(N'-2'-butylureido)-N-ethanol-2, 3-N-(N'-isobutylsdureido)-N-ethanol-2, 3-N-(N'-tertbutylureido)-N-ethanol-2, the various pentyl isomers of 3-N-(N'-pentylureido)-N-ethanol-2, the various hexyl isomers of 3-N-(N'-hexylureido)-N-ethanol-2, 3-N-(N'-cyclopentylureido)-N-ethanol-2, 3-N-(N'-cyclohexylureido)-N-ethanol-2 and 3-N-(N'-cycloheptylureido)-N-ethanol-2, for example.

8) Mixtures of these compounds have also been found to be useful in this invention.

The compounds of this invention have unique and surprising properties relative to their nearest homologues. For example, formamide and acetamide are known in the literature as cosolvents for aqueous ink jet inks. These compounds, however, pose serious toxicological problems; acetamide is a carcinogen and formamide is a developmental toxin. Furthermore, formamide, 1-formylpiperidine, N-(2-hydroxyethyl)formamide and N,N'-diacetyl-1,3-propanediamine are not effective pluggage inhibitors and diacetamide imparts non-printability and dispersion instability to an ink. Compounds of this invention such as isobutyramide, N,N'-ethylene bisacetamide, amides derived from N-(2-hydroxyethyl)acetamide and N-(2-hydroxyethyl)-butanamide and 1-pyrrolidinecarboxaldehyde, are less hazardous and produce more stable inks with better decap properties.

As little as 1% organic cosolvent may have some effect on decap performance, but about 3-10% is a useful range. Higher concentrations may be used to maximize pluggage resistance most preferably up to 15%, less preferably to 55%, and least preferably to 70%, but this increased pluggage resistance must be balanced against increased drying rate of the ink.

The nitrogen-containing cosolvents may be chosen for specific inks on the basis of a need for certain physical properties such as boiling point, melting point or drying rate with a specific set of ingredients. Mixtures of selected organic cosolvents may also be used to optimize and balance various ink properties. It should also be pointed out that the performance of the organic cosolvents is dependant upon their purity, as impurities can cause or retard plug formation. Therefore the source of the organic cosolvents may be important. Specific sources of cosolvents used in the Examples are indicated in Table 1.

OTHER INGREDIENTS

The ink may contain other ingredients. For example, the surfactants mentioned above may be used to alter surface tension as well as maximize penetration. However, they may also destabilize the pigment dispersion for pigmented inks. The choice of a specific surfactant is also highly dependent on the type of media substrate to be printed. It is expected that one skilled in the art can select the appropriate surfactant for the specific substrate to be used in printing. In aqueous inks, the surfactants may be present in the amount of 0.01-5% and preferably 0.2-2%, based on the total weight of the ink.

Biocides may be used in the ink compositions to inhibit growth of microorganisms. Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.) and sodium benzoate are examples of such biocides.

In addition, sequestering agents such as EDTA may also be included to eliminate deleterious effects of heavy metal impurities.

Other known additives, such as humectants, viscosity modifiers and other acrylic or non-acrylic polymers made also be added to improve various properties of the ink compositions.

INK PREPARATION

The ink compositions of the present invention are prepared in the same manner as other ink jet ink compositions. If a pigment dispersion is used as the colorant, the dispersion is prepared by premixing the selected pigment(s) and dispersant in water. The dispersion step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium. Amide cosolvents as well as other cosolvents may be present during the dispersion step.

If a dye is used as the colorant, there is no dispersant present and no need for pigment deaggregation. The dye-based ink is prepared in a well agitated vessel rather than in dispersing equipment.

It is generally desirable to make the ink jet inks in concentrated form, which is subsequently diluted with a suitable liquid to the appropriate concentration for use in the ink jet printing system. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the media substrate, such as, paper, fabric, film, etc., can be carried out rapidly and accurately.

The printed ink images have clear color tones, high density, excellent water resistance and lightfastness. Furthermore, the ink does not corrode parts of the ink jet printing device it comes in contact with, and it is essentially odorless.

The following examples further illustrate, but do not limit, the invention. The parts and percentages are by weight unless otherwise noted.

EXAMPLES

A pigmented ink composition was prepared and used with the organic cosolvents of the invention and other known cosolvents for comparison.

Preparation of Polymeric Dispersant

A block copolymer of n-butyl methacrylate and methacrylic acid was prepared by adding 3750 grams of tetrahydrofuran and 7.4 grams of p-xylene to a 12-liter flask equipped with a mechanical stirrer, thermometer, nitrogen inlet, drying tube outlet and addition funnels. Feed I, which consisted of 3.0 ml of a 1.0 M solution of tetrabutyl ammonium m-chlorobenzoate catalyst in acetonitrile, was started at 0 minutes and added over 150 minutes and 291.1 gm (1.25 mol) of an initiator, 1,1-bis(trimethylsiloxy-2-methyl propene, was injected. Feed II, which consisted of 1976 gm (12.5 mol) trimethylsilyl methacrylate, was started at 0 minutes and added over 35 minutes. One hundred eighty minutes after Feed II was completed (over 99% of the monomers had reacted), Feed III, which consisted of 1772 gm (12.5 mol) butyl methacrylate, was started and added over 30 minutes.

At 400 minutes, 780 grams of dry methanol were added to the above solution and distillation commenced. During the first stage of distillation, 1300.0 grams of material with a boiling point below 55° C. were removed from the flask. The theoretical amount of methoxytrimethylsilane, having a boiling point of 54° C., to be removed was 1144.0 grams. Distillation continued during the second stage while the boiling point increased to 76° C. 5100 grams of isopropanol were added during the second stage of distillation. A total of 7427 grams of solvent were removed.

The resultant resin solution contained 55.8% solids and had a neutralization equivalent of 4.65 milliequivalents of potassium hydroxide per gram of solids. The resin was neutralized by adding to a 1000 ml cylindrical polyethylene bottle:

200.0 grams dispersant solution
174.4 grams 15% potassium hydroxide
137.6 grams deionized water The mixture was tumbled on a roller mill for 3-4 hours and then magnetically stirred for 16-20 hours to give a slightly cloudy solution.

Preparation of Pigment Dispersion

The following materials were added to a 1 liter beaker:

78.3 grams deionized water
66.7 grams neutralized polymeric dispersant solution
3.0 grams 15% potassium hydroxide The solution was mechanically stirred while 20.0 grams of carbon black pigment, FW 18 (Degussa Corp., Ridgefield Park, N.J. 07660) were added slowly while stirring was continued for 30 minutes. The mixture was then added to a Mini Motormill 100 (Eiger Machinery Inc., Bensenville, Ill.) with another 32 grams of deionized water as a rinse. The contents were milled at 3500 rpm for one hour. The yield was 190.8 grams. The pH was 7.6. The particle size was 138 nm as determined by a Brookhaven BI-90 Particle Analyser (Brookhaven Instruments Corp., Holtsville, N.Y.).

Preparation of Hydroxyalkylamides and Hydroxyalkylureas

All chemical reactants were obtained from Aldrich Chemical Company, Milwaukee, Wis.

2',4'-dihydroxy-3',3'-dimethylbutanamido-N-ethanol-2 was prepared by adding DL-Pantolactone (6.51 g, 0.50 mol) to a clear homogeneous solution of ethanolamine (3.05 g, 0.50 mol) in tetrahydrofuran (30 ml). The reaction mixture was refluxed 16 hours, cooled, and concentrated in vacuum to give a viscous oil. The residue was titrated with ether to produce a white powder (8.8 g, 92%); mp=95°-96° C.

Hydroxyalkylureas were prepared by reacting the appropriate amine with the appropriate isocyanate. These preparations are illustrated by the preparation of 3-N-(tert-butylureido)-1,2-propanediol as follows:

A suspension of 3-amino-1,2-propanediol (9.11 g, 0.10 mol) in tetrahydrofuran (30 ml) was heated to 60° C. to give a fairly clear solution. The heating was discontinued and tert-butylisocyanate (9.91 g, 0.10 mol) was added dropwise to maintain a gentle reflux. The reaction was stirred overnight at 60° C. and was vacuum distilled to dryness. The residue was triturated with ethyl ether to produce a white powder (11.72 g, 66%); mp =76°-78° C. Likewise, cyclohexyl isocyanate, ethanolamine and diethanolamine were appropriately reacted to give the desired hydroxyalkylurea.

Preparation of Inks

Using the 22.5 grams of pigment dispersion from the above procedures, a series of aqueous inks were prepared by combining 2.6 grams diethylene glycol (Aldrich Chemical Co. Inc., Milwaukee, Wis.), 0.5 grams Silwet ® L-77 (Union Carbide Corp., Danbury, Conn.) 37.2 grams deionized water and 2.6 grams of a cosolvent identified in Table 1 with magnetic stirring over a period of 10-15 minutes.

TABLE 1

Control Cosolvent And Selected Cosolvent Identification and Source

| Comparative Cosolvents Source | Name | |
|---|---|---|
| Control # | | |
| 1 | Formamide | B |
| 2 | Acetamide | B |
| 3 | 1-Formylpiperidine | A |
| 4 | 4-Formylmorpholine | A |
| 5 | Diacetamide | A |
| 6 | N,N'-Diacetyl-1,3-propanediamine | C |
| 7 | Caprolactam | A |
| 8 | N-(2-Hydroxyethyl)formamide | E |
| 9 | N,N-Bis(2-hydroxyethyl)formamide | A |
| 10 | N,N-Bis(2-hydroxyethyl)acetamide | E |
| 11 | N,N-Bis(2-hydroxyethyl)hexanamide | E |
| Example # | | |
| 1 | Isobutyramide | D |
| 2 | 1-Pyrrolidinecarboxaldehyde | A |
| 3 | 1,4-Piperazinedicarboxaldehyde | A |
| 4 | N,N'-Ethylene-bisacetamide | C |
| 5 | N,N,N',N'-Tetramethyl-L-tartaric acid diamide | B |
| 6 | N-(2-hydroxyethyl)acetamide | E |
| 7 | N-(2-hydroxyethyl)butanamide | E |
| 8 | N-(2-hydroxypropyl-1)pentanamide | E |
| 9 | 2',4'-dihydroxy-3',3'-dimethylbutanamido-N-ethanol-2 | F |
| 10 | D-Panthenol or 2',4'-dihydroxy-3',3'-dimethylbutanamido)-N-propanol-3 | B |
| 11 | N-(tert-butyl)-ureido-N'-3-propanediol-(1,2) | F |
| 12 | N-(tert-butyl)-N'-(2-hydroxyethyl)urea | F |
| 13 | N-(cyclohexyl)-N'-(2-hydroxyethyl)urea | F |
| 14 | N-cyclohexyl-N',N'-bis(2-hydroxyethyl)-urea | F |

A. Aldrich Chemical Co. Milwaukee WI 53233
B. Fluka Chemical Corp. Ronkonkoma NY 11779
C. Pfaltz and Bauer, Waterbury, CT 06708
D. Eastman Kodak Co., Rochester, NY 14650
E. Dixon Chemicals, Sherwood Park, Alberta T8C 1G9 Canada
F. From above procedures.

TABLE 2

Decap Times
Decap times were obtained on a Hewlett Packard Deskjet printer that had been altered so that the ink cartridge would not be vacuum suctioned nor spit into a spittoon. The last time interval that the particular drop did not fail is recorded.

| Sample | 1st Drop seconds | 32nd Drop minutes |
|---|---|---|
| Control # | | |
| 1 | 60 | 1.5 |
| 2 | CARCINOGEN | |
| 3 | 30 | 1.5 |
| 4 | 50 | 1.4 |
| 5 | POOR PRINTER | |
| 6 | 40 | 1.5 |

TABLE 2-continued

Decap Times
Decap times were obtained on a Hewlett Packard Deskjet
printer that had been altered so that the ink cartridge
would not be vacuum suctioned nor spit into a spittoon.
The last time interval that the particular drop did not
fail is recorded.

| Sample | 1st Drop seconds | 32nd Drop minutes |
|---|---|---|
| 7 | HIGHLY TOXIC | |
| 8 | 40 | 0.6 |
| 9 | 40 | 1.6 |
| 10 | 65 | 3.0 |
| 11 | 70 | 2.0 |
| Example # | | |
| 1 | 115 | 3.8 |
| 2 | 75 | 180–360 |
| 3 | 85 | 180–360 |
| 4 | 75 | 30–60 |
| 5 | 70 | 540–720 |
| 6 | 70 | 360–540 |
| 7 | 70 | >720* |
| 8 | 55 | 540–720 |
| 9 | 50 | 120–240 |
| 10 | 45 | >900* |
| 11 | 55 | >720* |
| 12 | 50 | 26 |
| 13 | 30 | 5–10 |
| 14 | 50 | 960–1080 |

*Test terminated at indicated time interval without a 32nd drop failure.

TABLE 3

Dispersion Stability
Dispersion stability was obtained by subjecting 15
grams of ink to four temperature cycles, each consisting of
4 hours at −20° C. and 4 hours at 60° C. Particle sizes
were measured on a Brookhaven BI-90 (Brookhaven
Instruments Corp., Holtsville, NY 11742)
before and after cycling.

| Sample | Change in Particle Size, delta nanometers |
|---|---|
| Control # | |
| 1 | 4 |
| 2 | CARCINOGEN |
| 3 | 9 |
| 4 | −2 |
| 5 POOR PRINTER | 276 |
| 6 | 8 |
| 7 | HIGHLY TOXIC |
| 8 | 5 |
| 9 | 12 |
| 10 | 26 |
| 11 | 34 |
| Example # | |
| 1 | 3 |
| 2 | 9 |
| 3 | 13 |
| 4 | 3 |
| 5 | 3 |
| 6 | 10 |
| 7 | 2 |
| 8 | 7 |
| 9 | 5 |
| 10 | 1 |
| 11 | 3 |
| 12 | 2 |
| 13 | −1 |
| 14 | 8 |

What is claimed is:

1. An aqueous ink jet ink composition consisting essentially of:
   (a) an aqueous carrier medium;
   (b) a colorant selected from the group consisting of a pigment dispersion and a dye; and
   (c) an organic cosolvent having a solubility in water of at least 4.5% at 25° C., and which is selected from the group consisting of:
   1) alkyl amides having the general structure:

$$R'-\overset{O}{\underset{\|}{C}}-NHR$$

wherein
   R=—H or —CH$_3$,
   R'=—C$_3$H$_8$ or —C(CH$_3$)$_2$, when R=—H, and
   R'=—C$_2$H$_5$, when R=—CH$_3$;

2) cyclic amides having the general structure:

$$\begin{array}{c}CH_2CH_2\\ \diagdown \\ \diagup \\ CH_2CH_2\end{array} N-\overset{O}{\underset{\|}{C}}-R$$

wherein R=—H or —CH$_3$;

3) cyclic diamides having the general structure:

$$R-\overset{O}{\underset{\|}{C}}-N\begin{array}{c}CH_2CH_2\\ \diagup \diagdown \\ \diagdown \diagup \\ CH_2CH_2\end{array}N-\overset{O}{\underset{\|}{C}}-R$$

wherein R=—H or —CH$_3$;

4) alkyl diamides having the general structure:

$$R-\overset{O}{\underset{\|}{C}}-NHCH_2CH_2NH-\overset{O}{\underset{\|}{C}}-R$$

wherein R=—H or —CH$_3$;

5) alkyl diol diamides having the general structure:

$$R_2N-\overset{O}{\underset{\|}{C}}-CH(OH)CH(OH)-\overset{O}{\underset{\|}{C}}-NR_2$$

wherein R=—H, —CH$_3$ or —C$_2$H$_2$;

6) hydroxyamides having the general structure:

$$(C_aH_{2a+n-x})(OH)_x-\overset{O}{\underset{\|}{C}}-N\begin{array}{c}(C_bH_{2b+1-y})(OH)_y\\ \diagdown \\ H\end{array}$$

wherein
   a=1–6,
   b=2–4,
   x=0–3,
   y=0–3,
   x+y=1–6,
   n=+1 or −1,
   a≧x,
   b≧y;

7) hydroxyalkyl ureas having the general structure:

$$(C_aH_{2a+n})-\overset{H}{\underset{|}{N}}-\overset{O}{\underset{\|}{C}}-\overset{R}{\underset{|}{N}}-R'$$

wherein
   a=1–7,
   n=+1 or −1,

R is selected from the group consisting of —CH$_2$CHOHCH$_2$OH and —CH$_2$CH$_2$OH, and R' is selected from the group consisting of —CH$_2$CH$_2$OH and —H; and 8) mixtures thereof.

2. The ink composition of claim 1, wherein said colorant is a pigment dispersion comprising a pigment and a dispersant.

3. The ink composition of claim 2, wherein the dispersant is a polymeric dispersant.

4. The ink composition of claim 3, wherein said polymeric dispersant comprises a block copolymer and wherein the ink composition consisting essentially of approximately 0.1 to 8% pigment, 0.1 to 8% block copolymer, and 94 to 99.8% aqueous carrier medium plus organic cosolvent, based upon the total weight of the ink composition.

5. The ink composition of claim 2, wherein the pigment comprises particles having a median particle size of approximately 0.01 to 0.3 micron.

6. The ink composition of claim 1, wherein the organic cosolvent is represented by structure 6), and wherein a=1–4, b=2–3 and y=1.

7. The ink composition of claim 1, wherein the organic cosolvent is represented by structure 6), and wherein x=2 and y=1–2.

8. The ink composition of claim 1, wherein the organic cosolvent is represented by structure 7), and wherein a=4–6 and R=—CH$_2$CHOHCH$_2$OH.

9. The ink composition of claim 1, wherein the organic cosolvent is represented by structure 7), wherein a=4–6 and wherein R and R'=—CH$_2$CH$_2$OH.

10. The ink composition of claim 1, wherein the organic cosolvent is represented by structure 7), wherein a=4–6, R=—CH$_2$CH$_2$OH and R'=H.

11. The ink composition of claim 1, 8 or 10 wherein (C$_a$H$_{2a+n}$)=tert-butyl.

12. The ink composition of claim 1, 8 or 10 wherein (C$_a$H$_{2a+n}$)=cyclohexyl.

13. The ink composition of claim 1, wherein the cosolvent is represented by structure 1), and wherein R=—H and R'=—C(CH$_3$)$_2$.

14. The ink composition of claim 1, wherein the cosolvent is represented by structure 2), and wherein R=—H.

15. The ink composition of claim 1, wherein the cosolvent is represented by structure 3), and wherein R=—H.

16. The ink composition of claim 1, wherein the cosolvent is represented by structure 4), and wherein R=—CH$_3$.

17. The ink composition of claim 1, wherein the cosolvent is represented by structure 5), and wherein R=—CH$_3$.

18. The ink composition of claim 17, wherein the cosolvent is N,N,N',N'-tetramethyl-L-tartaric acid diamide.

19. The ink composition of claim 1, wherein the aqueous carrier medium comprises water and at least one water soluble organic solvent.

20. The ink composition of claim 19, wherein the aqueous carrier medium comprises a mixture of water and at least one water soluble organic solvent having at least 1 hydroxyl groups.

21. The ink composition of claim 1, wherein said colorant is a dye and wherein said ink composition consisting essentially of approximately 0.2% to 20% dye, and 80 to 99.8% aqueous carrier medium plus organic cosolvent, based on the total weight of the ink composition.

22. The ink composition of claim 1, wherein said ink composition has a surface tension of approximately 30 to 70 dyne/cm and a viscosity of no greater than 20 cP at 20° C.

23. The ink composition of claim 1, further consisting essentially of a surfactant.

* * * * *